(12) United States Patent
Hartwell et al.

(10) Patent No.: US 6,509,620 B2
(45) Date of Patent: Jan. 21, 2003

(54) FLEXURE COUPLING BLOCK FOR MOTION SENSOR

(75) Inventors: Peter G. Hartwell, Sunnyvale, CA (US); Donald J. Fasen, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/867,667

(22) Filed: May 31, 2001

(65) Prior Publication Data

US 2002/0179983 A1 Dec. 5, 2002

(51) Int. Cl.[7] .......................... H01L 29/82; H01L 43/00
(52) U.S. Cl. ...................... 257/415; 257/416; 257/417; 257/418; 257/419; 257/420; 257/421; 257/422; 257/423; 257/424; 257/425; 257/426; 257/427
(58) Field of Search ................................. 257/415–427

(56) References Cited

U.S. PATENT DOCUMENTS

| | | | | |
|---|---|---|---|---|
| 5,659,195 A | * | 8/1997 | Kaiser et al. | ............... 257/415 |
| 6,071,426 A | * | 6/2000 | Lee et al. | ...................... 216/26 |
| 6,130,464 A | * | 10/2000 | Carr | ........................... 257/417 |
| 6,289,732 B1 | * | 9/2001 | Murari et al. | .................. 73/493 |
| 2002/0008296 A1 | * | 1/2002 | Chan et al. | .................. 257/415 |
| 2002/0025595 A1 | * | 2/2002 | Xu et al. | ....................... 438/48 |
| 2002/0047172 A1 | * | 4/2002 | Reid | ........................... 257/415 |

* cited by examiner

Primary Examiner—Stephen D. Meier
Assistant Examiner—Ida M. Soward (57) ABSTRACT

A microelectromechanical system (MEMS) device is disclosed for determining the position of a mover. The MEMS device has a bottom layer connected to a mover layer. The mover layer is connected to a mover by flexures. The mover moves relative to the mover layer and the bottom layer. The flexures urge the mover back to an initial position of mechanical equilibrium. The flexures include coupling blocks to control movement of the mover. The MEMS device determines the location of the mover by determining the capacitance between mover electrodes located on the coupling blocks of the flexures and counter electrodes located on an adjacent layer. The coupling block moves according to a determinable relationship with the mover. As the coupling block moves, the capacitance between the mover electrode and the counter electrode changes. A capacitance detector analyzes the capacitance between the electrodes and determines the position of the mover.

20 Claims, 6 Drawing Sheets

FLEXURE COUPLING BLOCK FOR MOTION SENSOR

FIELD OF INVENTION

The present invention relates generally to semiconductor chip architecture. More particularly, it relates to a position-sensing system for a microelectromechanical systems (MEMS) device.

BACKGROUND

In the field of microelectromechanical systems (MEMS) devices, portions of a semiconductor wafer, such as a memory in a computer system, may move relative to other parts of the wafer. For example, a memory portion of a computer chip may store data written to it and read from it by read/write heads. A MEMS device may use stationary read/write heads that access a moveable memory portion. The memory portion may move relative to the read/write heads using an actuator motor. The moveable structure is referred to herein as a "mover."

In one use, a MEMS device may use a mover that moves in two dimensions, X and Y. For example, the mover may be part of a mover layer of a three-layer wafer system. The mover is connected to other portions of the mover layer by spring devices, or flexures. Flexures allow the mover to move in two dimensions, while suspending the mover between the layers, and while urging the mover back to a static position, or mechanical equilibrium. Flexures may include coupling blocks to control movement of the mover. A motor causes the mover to move within the layers.

MEMS devices allowing a mover to move in two dimensions are known. In order to effectively use the MEMS device, it is desirable to know the position of the mover, in terms of its X and Y coordinates. In the memory example with read/write heads, the MEMS device would have to know where the mover is in order to know which portion of memory is being accessed. Existing systems use capacitor plates located on the mover to determine its position. For example, one plate may be located on the mover and the other plate may be located on a stationary portion off of the mover. The overlap of the plates creates a capacitor that changes in capacitance depending upon the position of the mover, based on the equation $$C \propto \frac{\varepsilon_o \cdot A}{d},$$

where C is the capacitance, $\varepsilon_o$ is the dielectric constant, A is the area of overlap between the capacitive plates, and d is the distance between the plates. Various ways are possible to create capacitances that depend upon the position of the mover. The area of overlap or the distance between the plates can be changed by moving the mover, thereby changing the capacitance between opposing plates. The problem with existing methods is that they position the capacitive plates on the mover, thereby consuming a portion of the mover that would otherwise be available for productive use, for example, as memory. What is needed is a way to determine the position of the mover without consuming valuable space on the mover.

SUMMARY OF INVENTION

A microelectromechanical system (MEMS) device is disclosed for determining the position of a mover. The MEMS device has a bottom layer connected to a mover layer. The mover layer is connected to a mover by flexures. The mover moves relative to the mover layer and the bottom layer. The flexures urge the mover back to an initial position of mechanical equilibrium. The flexures include coupling blocks to control movement of the mover. The mover moves primarily in two dimensions, staying substantially in the same plane as the mover layer, such that the distance from the mover to the bottom layer stays substantially constant as the mover moves. The MEMS device determines the location of the mover by determining the capacitance between mover electrodes located on the coupling blocks of the flexures and counter electrodes located on an adjacent layer. The coupling block moves according to a determinable relationship with the mover. For example, movement of the coupling block may be directly proportional to movement of the mover. As the coupling block moves, the capacitance between the mover electrode and the counter electrode changes. A capacitance detector analyzes the capacitance detected between the electrodes determines the position of the mover. In one embodiment, the mover may be used as a memory to store information written by and read from read/write heads positioned on the top or bottom layers. The mover moves using an actuator motor to enable data to be written to or read from the desired location on the mover. In one embodiment, the mover layer and the bottom layer are part of a single semiconductor wafer.

A MEMS device is also disclosed for a three-wafer semiconductor device having a mover layer connected to a top layer and a bottom layer, in which each of the layers is a separate wafer. The mover layer is connected by a flexure to a mover. The flexure includes a coupling block for controlling movement of the mover. The coupling block has a mover electrode, and the top or bottom layers, or both, have a counter electrode. A capacitor is created between the mover electrode and the counter electrode, which capacitance changes as the mover moves. A capacitance detector determines the position of the mover based on the capacitance.

A flexure is also disclosed for connecting a mover to a layer. The flexure allows the mover to move relative to adjacent layers and uses a coupling block to control movement. Movement of the coupling block is known relative to movement of the mover. The coupling block of the mover has a mover electrode for determining the position of the mover based on a capacitance detected on the mover electrode. The capacitance detected by the mover may be used in conjunction with capacitances detected on other mover electrodes on other coupling blocks of other flexures to determine the mover's position.

DETAILED DESCRIPTION

Figure 1:
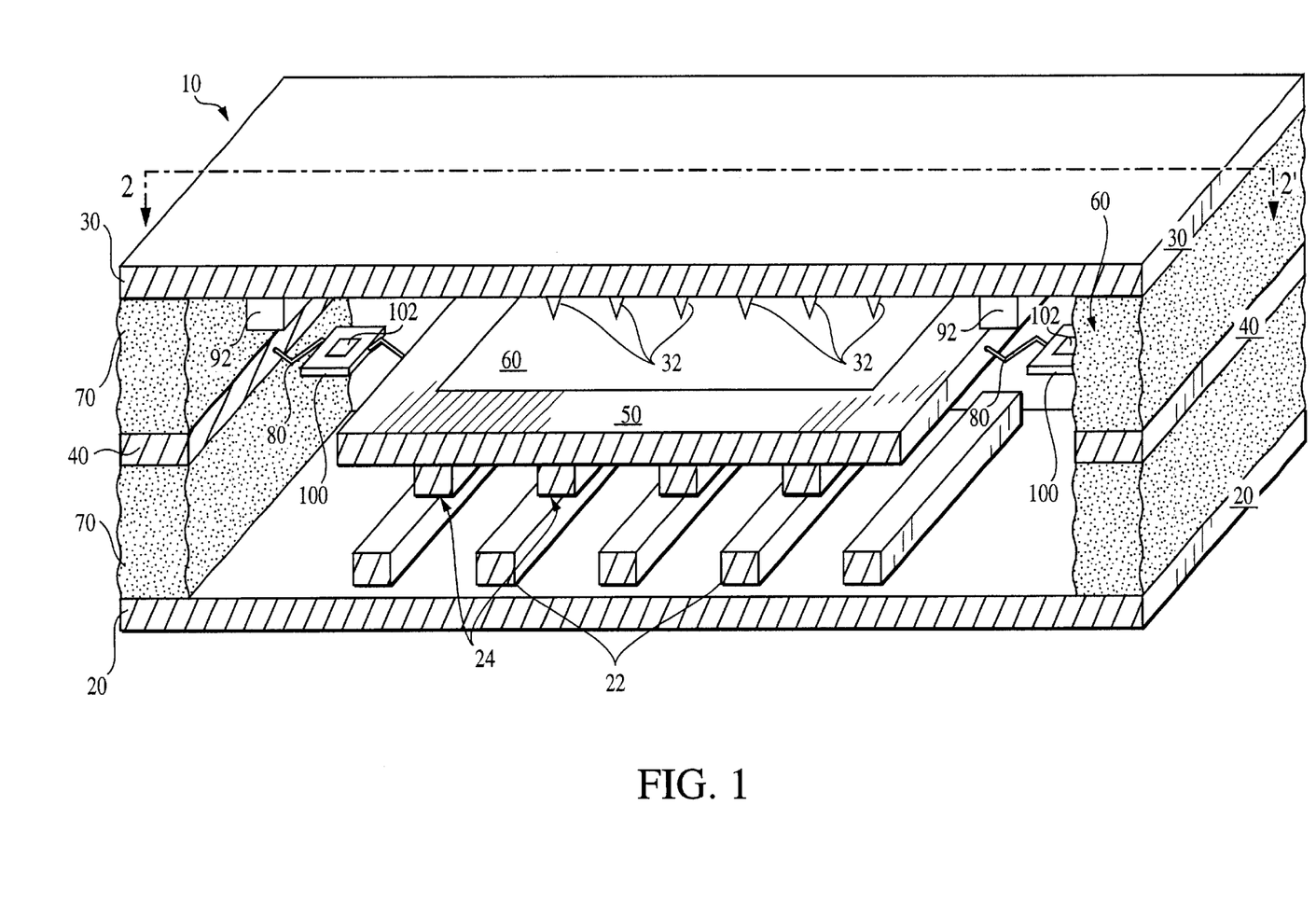
FIG. 1 shows a perspective view of a three-wafer MEMS device.

FIG. 1 shows a three-layer MEMS device 10, such as a data storage device 10. The MEMS device 10 may be encapsulated in a protective shell (not shown) as part of an integrated circuit chip. The MEMS device 10 has a bottom layer 20, a top layer 30, and a middle layer 40, also referred to as a mover layer 40. The layers 20, 30, 40 are connected by connecting material 70. The mover layer 40 is connected to a mover 50 that is suspended between the bottom and top layers 20, 30. In the embodiment shown in FIG. 1, the MEMS device 10 is a three-wafer system, in which each of the layers 20, 30, 40 is a separate semiconductor wafer. In the multi-wafer embodiment of FIG. 1, the connecting material 70 may be wafer bond 70 that holds separate wafers together. One skilled in the art will recognize that the MEMS device 10 may be embodied in forms including various numbers of semiconductor wafers. In other embodiments, such as others described herein, the MEMS device 10 may comprise layers formed in a single wafer or from two wafers.

The mover 50 is any portion of the mover layer 40 that moves in one, two, or three dimensions. In one embodiment, the mover 50 may comprise a data storage medium 60. Data may be read from and written to the storage medium 60 using read/write heads 32, or emitters 32, located in the top layer 20. Data is read from or written to a particular physical location on the storage medium 60, depending upon the position of the mover 50. The mover 50 may be moved using an actuator motor comprising electrodes 22, 24.

The mover 50 is held in place between the bottom and top layers 20, 30 by a flexure 80. As used herein, a flexure 80 refers to any spring-like structure connecting the mover 50 to the mover layer 40, which allows the mover 50 to move in at least one dimension relative to the mover layer 40. Flexures 80 can have any shape or configuration, and they may urge the mover 50 back to a static position, or mechanical equilibrium. Flexures 80 may be made from the same material as the mover layer 40 and the mover 50, and may be a micro-machinable material such as silicon. In one embodiment, one or more flexures 80 are connected to the mover layer 40 and allow the mover 50 to move in two dimensions, such that mover 50 remains at a substantially constant distance from the top and bottom layers 20, 30.

In the embodiment shown in FIG. 1, the flexure 80 comprises a coupling block 100 and the flexural connectors (not shown). The coupling block 100 and arrangement of flexural connectors provide for the requisite degrees of freedom necessary for operation (motion) of the mover 50. In addition, the coupling block 100 allows for compensation of the flexural connectors to prevent "axial stiffening" and thereby lessen the consequent non-linearity in the motion of the mover 50. One skilled in the art will recognize the use of coupling blocks 100, or floating links 100, in the design of a spring-mass system and will recognize that various designs of coupling blocks 100 and connectors may be used.

The position of the mover 50 is determined using a capacitor formed by a capacitive plate 102 on the coupling block 100, referred to as a mover electrode 102, and a capacitive plate 92 located on one of the adjacent layers 20, 30, referred to as a counter electrode 92. The coupling block 100 is designed to move predictably as the mover 50 moves. In one embodiment, movement of the coupling block 100 may be directly related to movement of the mover 50. In other embodiments, different relationships may be used. The mover electrode 102 moves relative to the counter electrode 92 as the mover 50 moves, changing the capacitance detected between the mover electrode 102 and the counter electrode 92. In the embodiment of FIG. 1, the mover 50 moves in two dimensions, at a constant distance from the top layer 30, such that the area of overlap between the mover electrode 102 and the counter electrode 92 changes as the mover 50 moves. In other embodiments, the distance between the mover 50 and the adjacent layers 20, 30 may vary as the mover 50 moves, for example if the mover 50 moves in three dimensions. Such a movement would change the capacitance based on the change in distance between electrodes, if the counter electrode 92 is positioned on an adjacent layer 20, 30 as shown in FIG. 1. In other embodiments, the counter electrode 92 may be positioned on the mover layer 40 and may measure a change in capacitance caused either by a change in area of overlap or by a change in distance between electrodes 92, 102, depending upon the movement of the mover 50.

Figure 2:
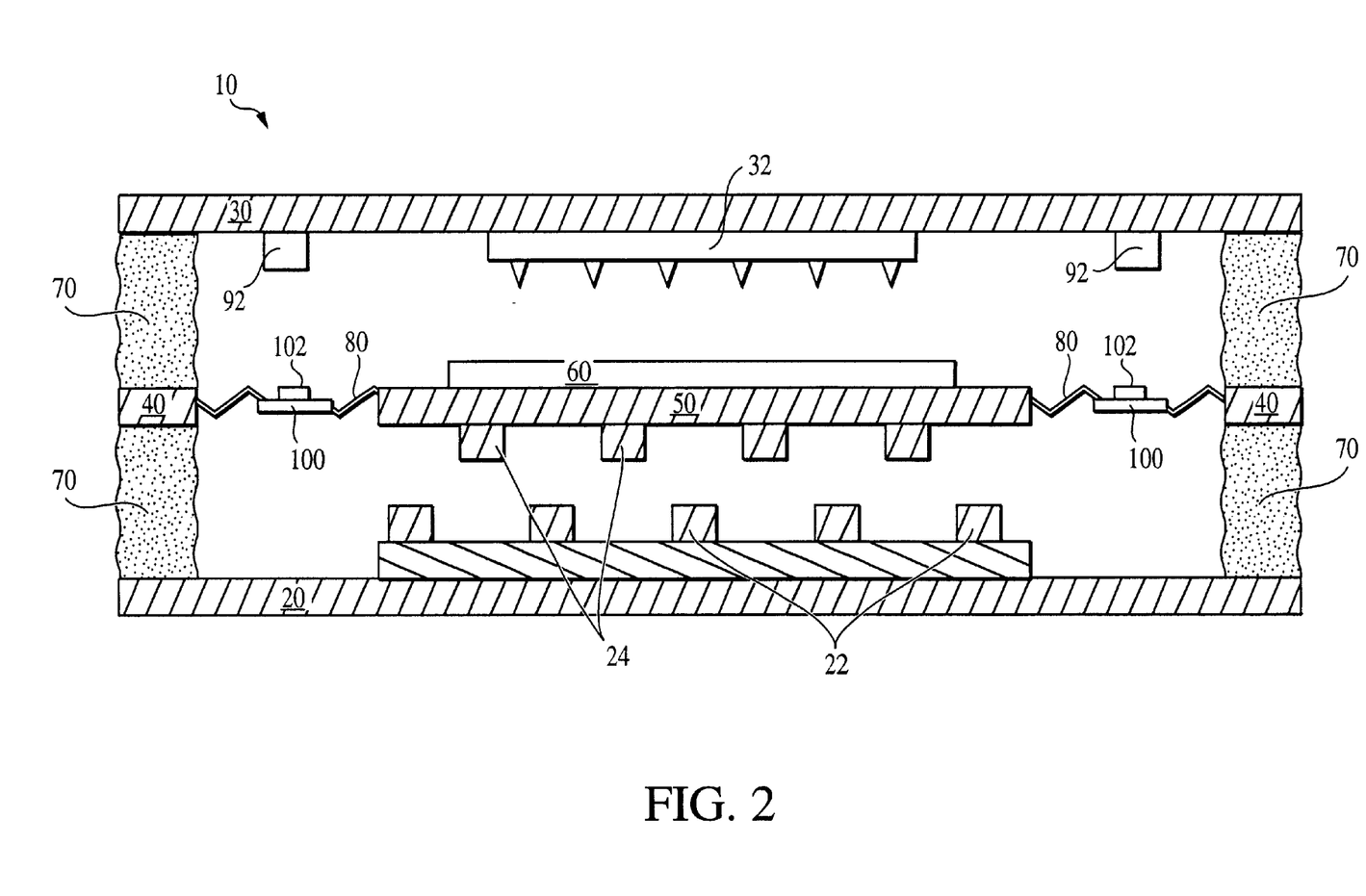
FIG. 2 shows a cross-section of the MEMS device of FIG. 1 taken along the line 2–2'.

FIG. 2 shows a cross-section of the MEMS device 10 taken along the line 2–2' shown in FIG. 1. The flexures 80 are shown to have coupling blocks 100 that move in proportion to movement of the mover 50. The coupling blocks 100 have mover electrodes 102 located thereon. Complementary counter electrodes 92 are located on an adjacent layer 30 to create a capacitance that varies with position of the mover 50. In the example of FIGS. 1 and 2, the counter electrodes 92 are located on the top layer 30 and the mover electrodes 102 are located on the top of the coupling blocks 100. In other embodiments, the counter electrodes 92 may be positioned on the bottom layer 20 and the mover electrodes 102 may be on the bottom side of the coupling block 100. In still other embodiments, the counter electrodes 92 may be located on the mover layer 40. In still other embodiments, counter electrodes 92 may be positioned on more than one layer, such as both the bottom and top layers 20, 30 with appropriate complementary mover electrodes 102.

In the embodiment shown in FIGS. 1 and 2, the mover electrode 102 and the counter electrode 92 a single mover electrode 102 is shown on each coupling block 100, and the mover electrode 102 and the counter electrode 92 have a generally rectangular surface area. In other embodiments, a single coupling block 100 may have multiple mover electrodes 102 with corresponding counter electrodes 92. Also, the surface areas of the electrodes 92, 102 may be of any shape, although they are shown as being rectangular. Also in the embodiment of FIGS. 1 and 2, a single flexure 80 is shown to be connected on each side of the mover 50. In other embodiments, any number of flexures 80 having any number of coupling blocks 100 may be used. Also in the embodiment shown in FIGS. 1 and 2, the electrodes 92, 102 are shown as a separate element attached to the coupling block 100 or to an adjacent layer 20, 30. In other embodiments, the electrodes 92,102 may be defined regions within the mover 50 or the layers 20, 30, formed, for example, by a doping process. In one embodiment, a single mover electrode 102 may form capacitors with two or more corresponding counter electrodes 92, for example one positioned on a top layer 30 and another positioned on a bottom layer 20.

Figure 3:
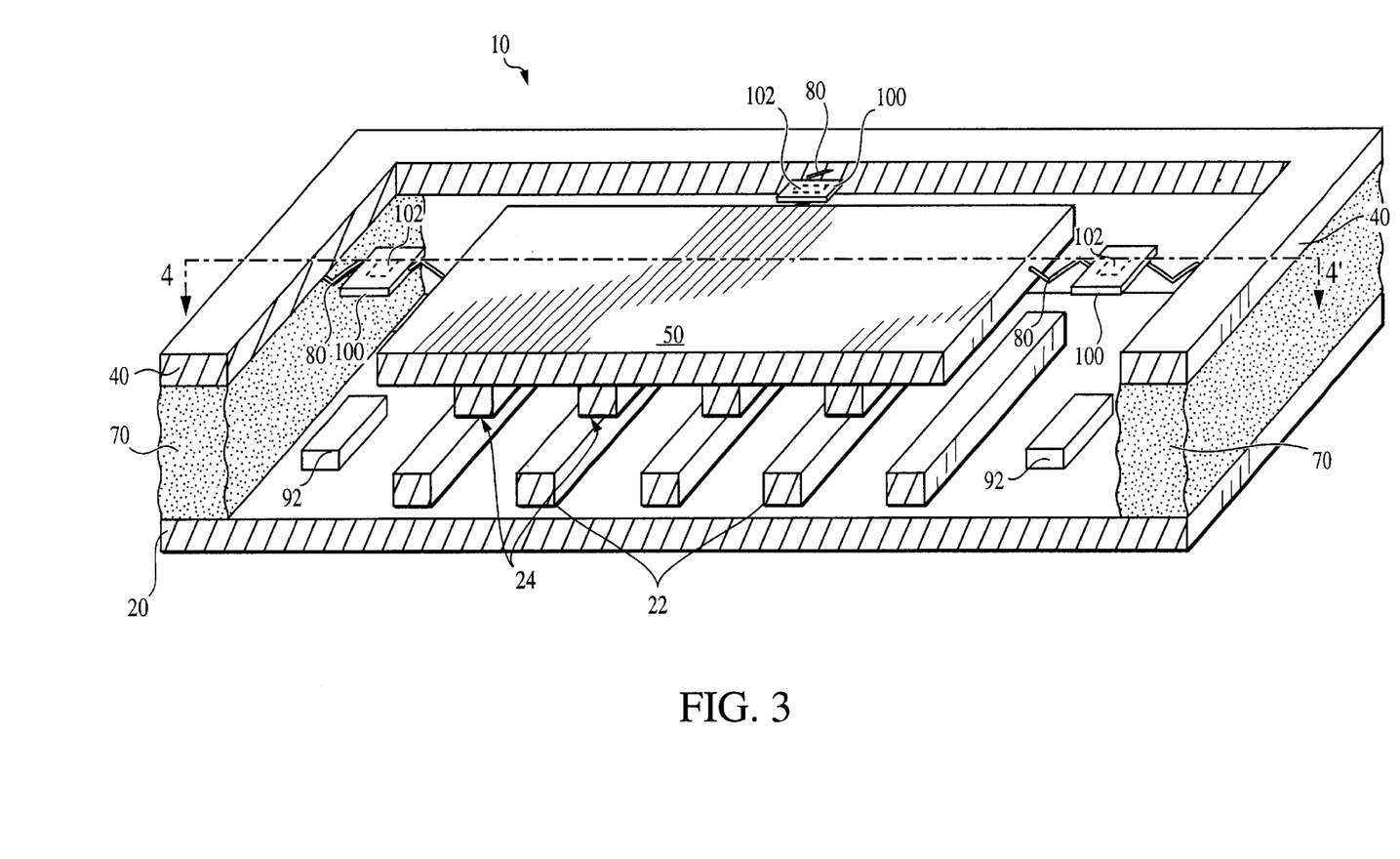
FIG. 3 shows a perspective view of a one-wafer MEMS device.
Figure 4:
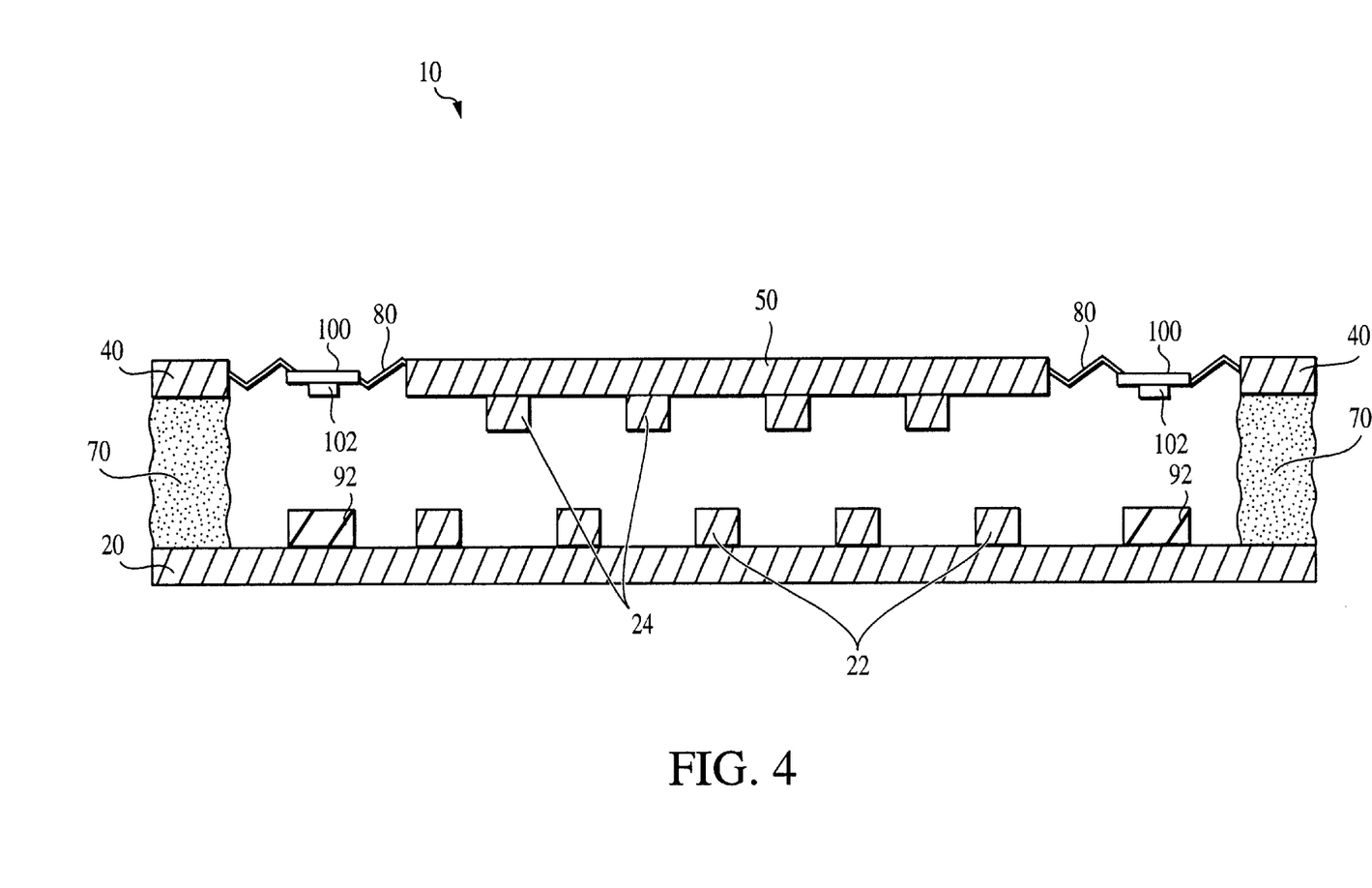
FIG. 4 shows a cross-section of the MEMS device of FIG. 3 taken along the line 4–4'.

FIG. 3 shows another embodiment of the MEMS device 10 in a single semiconductor wafer having a bottom layer 20 and a mover layer 40 connected by connecting material 70. FIG. 4 shows a cross-section of the MEMS device 10 of FIG. 3 taken along the line 4–4'. In the single-wafer embodiment, connecting material 70 may be a sacrificial layer of the wafer. In the embodiment of FIGS. 3 and 4, there is no top layer, and the counter electrodes 92 are located on the bottom layer 20. The mover electrodes 102 are located on the bottom side of the coupling blocks 100, facing the bottom layer 20. Like FIGS. 1 and 2, the embodiment of FIGS. 3 and 4 also uses an actuator motor comprising electrodes 22, 24 on the bottom layer 20 and the mover 50, which cause the mover 50 to move. Like the device shown in FIGS. 1 and 2, the single-wafer device 10 of FIGS. 3 and 4 may be encapsulated in a protective shell.

Figure 5:
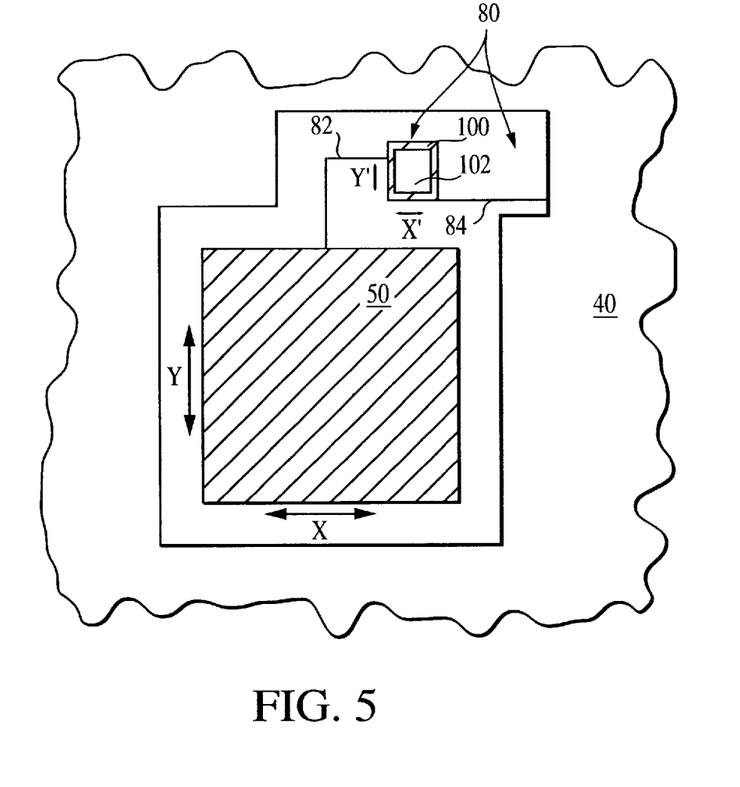
FIG. 5 shows a mover and coupling block of the system.

FIG. 5 shows a top view of the mover wafer 40 of a MEMS device 10, similar to the embodiments shown in FIGS. 1–4. The mover 50 is connected to the mover layer 40 by a flexure 80. The flexure 80 shown is a common MEMS structure using a coupling block 100 to support the flexure 80 and control movement of the mover 50. The system uses an area on the coupling block 100 for the mover electrode 102. An opposing plate, also referred to as a counter electrode, (not shown in FIG. 5) is located on an adjacent layer 20, 30 to form a capacitor, similar to that used with existing systems.

Movement and position of the coupling block 100 is proportionate to movement and position of the mover 50. That is, the coupling block 100 moves according to a known relationship with movement of the mover 50. Movement of the coupling block 100 may be directly proportional to movement of the mover 50, or it may be related in any other known manner as part of the design of the flexure 80.

As the mover 50 moves, the coupling block 100 moves, causing the capacitance to vary with position of the mover 50. In the example of FIG. 5, the flexure 80 allows the mover 50 to move in two dimensions, x and y as shown. As the mover 50 moves in the x and y directions, the coupling block 100 moves in a known relationship, x' and y' to movement on the mover. For example, movement of the coupling block 100 may be directly proportional to movement of the mover 50. In one embodiment, multiple flexures 80 each having its own coupling block 100 and capacitor plate 102 may be used to better determine the position.

Figure 6:
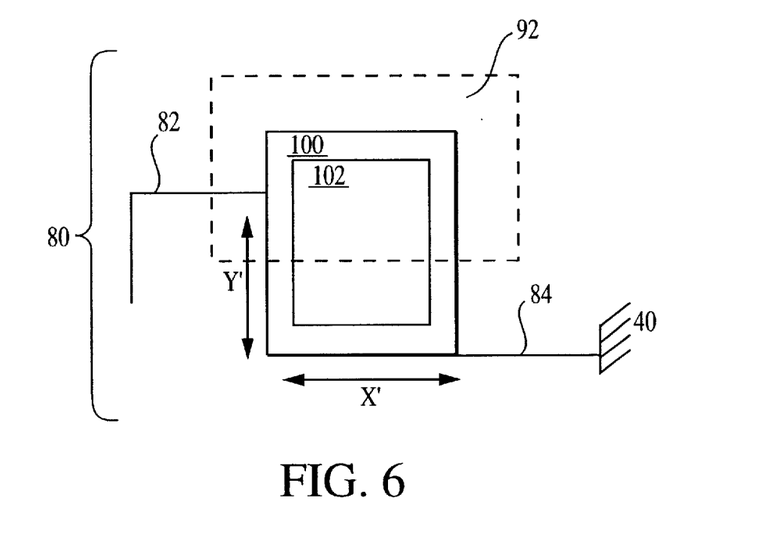
FIG. 6 shows a more detailed view of the flexure.

FIG. 6 shows a diagram of the flexure 80. In the example shown in FIG. 6, the flexure 80 allows the mover 50 to move in two dimensions and uses a coupling block 100 to control movement. The flexure 80 has a first flexural connector 82 that connects the mover 50 to the coupling block 100 and a second flexural connector 84 that connects the coupling block 100 to the mover layer 40. The coupling block 100 has a mover electrode 102 and moves in proportion to the mover 50. A counter electrode 92 is located on an adjacent layer 20,30 to form a capacitor. In one embodiment, the first connector 82 and the second connector 84 may be directly connected between the coupling block 100 and the mover layer 40 of the mover 50, respectively. In other embodiments, the first and second connectors 82, 84 may be indirectly connected and other coupling blocks 100, or other structures, may be used as part of the flexure 80. One skilled in the art will recognize that the device 10 may be implemented with multiple coupling blocks 100 and multiple flexural connectors 82, 84.

In one embodiment, the mover 50 and the coupling block 100 move in two dimensions, such that the distance between the mover electrode 102 and the counter electrode 92 remains substantially constant. In this embodiment, the area of overlap between the mover electrode 102 and the counter electrode 92 changes as the mover 50 moves, causing a change in the capacitance. In other embodiments, the mover 50 may move in a manner that causes the distance between the mover electrode 102 and the counter electrode 92 changes, causing a change in capacitance. For example, the mover 50 may move in three dimensions, or the counter electrode 92 may be positioned on the mover layer 40 or other portion such that two-dimensional movement changes the distance between the electrodes 92, 102.

Figure 7:
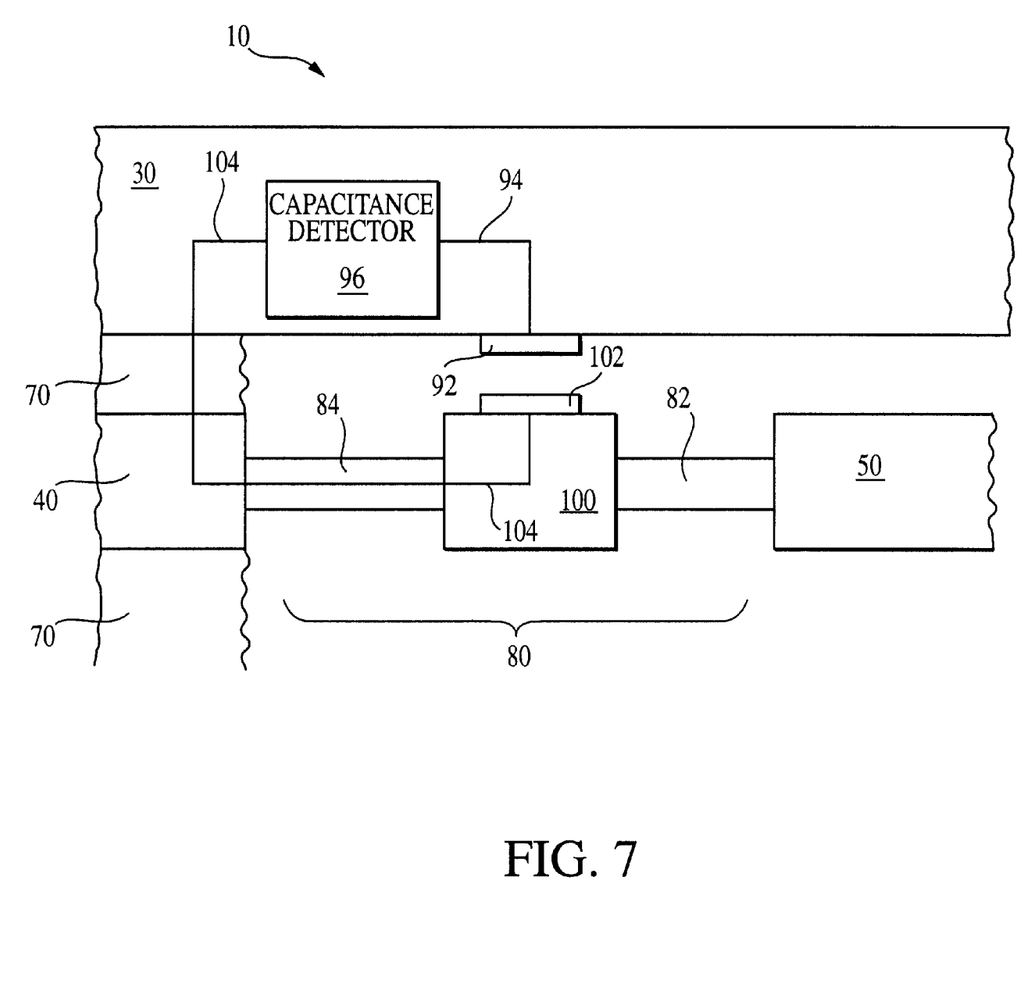
FIG. 7 shows the MEMS device including a block diagram of the capacitance detector used to determine the position of the mover.

FIG. 7 shows a cross-section of the MEMS device 10 showing one way of determining capacitance between the mover electrode 102 and the counter electrode 92. A flexure 80 is shown having a coupling block 100, a first connector 82 connecting the coupling block 100 to the mover 50, and a second connector 84 connecting the coupling block 100 to the mover layer 40. In the embodiment shown in FIG. 7, the coupling block 100 has a mover electrode 102 opposing a counter electrode 92. The counter electrode 92 is fixedly connected to the top layer 30. The counter electrode 92 and the mover electrode 102 are electrically connected to a capacitance detector 96 by electrode connectors 94, 104. The mover electrode 102 and the counter electrode 92 are connected to a power source, which may be located separate from the MEMS device 10. In the embodiment shown, the electrode connector 104 from the mover electrode is shown passing through the second connector 84 of the flexure 80. In other embodiments, the electrode connector 104 may not pass through the flexure 80, but may instead have a separate connection, for example, passing along side the connectors 84 of the flexure 80. In still other embodiments, the electrode connector 104 may use a wireless connection to connect to the capacitance detector 96.

The capacitance detector 96 comprises hardware capable of determining the capacitance detected between the electrodes 92, 102. As used herein, capacitance detector 96 refers to any hardware or software system for determining the capacitance between two electrodes, such as the counter electrode 92 and the mover electrode 102. In one embodiment, multiple mover electrodes 102 and counter electrodes 92 are used, and the capacitance detector 96 receives inputs from some or all of these electrodes to determine the capacitance detected between the electrodes 92, 102. In this embodiment, the capacitance detector 96 may be a processor that determines the position of the mover 50. In another embodiment, multiple capacitance detectors 96 are used, each of which determines the capacitance between a mover electrode 102 and a counter electrode 92 and sends information about the capacitance to a separate processor (not shown). In the embodiment shown, the capacitance detector 96 is located in the top layer 30, receiving the connector 104 from the mover electrode 102 through the mover layer 40 and the connecting material 70. In one embodiment, the capacitance detector 96 uses an open-loop system that passes an AC signal through the electrodes 92, 102 to measure the capacitance. The AC signal may originate from the capacitance detector 96 or from a source off of the chip. Another embodiment uses a closed-loop system in which electrodes 92, 102 may be used as capacitors or actuators in a feedback loop to create an error signal based on movement of the mover 50, which error signal may be proportional to such movement. One skilled in the art will understand that the capacitance detector 96 may be positioned in various locations, as desired.

Although the present invention has been described with respect to particular embodiments thereof, variations are possible. The present invention may be embodied in specific forms without departing from the essential spirit or attributes thereof. In particular, although specific embodiments of the invention are shown in a three-layer wafer system and having electrodes positioned in specific locations, one skilled in the art will recognize that the invention includes systems having various numbers of wafers using various positioning of electrodes. It is desired that the embodiments described herein be considered in all respects illustrative and not restrictive and that reference be made to the appended claims and their equivalents for determining the scope of the invention.

We claim:

1. A system for determining position of a mover in a microelectromechanical system (MEMS) device, the system comprising:
   a mover layer;
   a mover capable of moving relative to the mover layer;
   a flexure that connects the mover to the mover layer, the flexure comprising a mover electrode; and
   a counter electrode capable of creating a capacitance with the mover electrode, wherein movement of the mover causes the mover electrode to move relative to the counter electrode.

2. The system of claim 1, wherein the flexure comprises
   a coupling block that moves as the mover moves, wherein the mover electrode is positioned on the coupling block;
   a first connector that connects the coupling block to the mover; and
   a second connector that connects the coupling block to the mover layer.

3. The system of claim 2,
   wherein the coupling block compensates for movement of the mover to reduce non-linearity of motion of the mover,
   wherein the first connector is a flexural connector having a first end connected to the mover and a second end connected to the coupling block, and
   wherein the second connector is a flexural connector having a first end connected to the mover and a second end connected to the mover layer.

4. The system of claim 3, wherein the coupling block moves in a known relationship to movement of the mover, further comprising a first layer adjacent to the mover layer, wherein the counter electrode is fixedly connected to the first layer, the counter electrode being adjacent the mover electrode and having an area of overlap, which area changes as the mover moves laterally relative to the first layer.

5. The system of claim 4, further comprising a second layer disposed parallel to the mover layer and first layer such that the mover layer is positioned between the first and second layers.

6. The system of claim 5, further comprising:
   an actuating motor that causes the mover to move, the motor comprising
     a first set of electrodes connected to the first layer; and
     a second set of electrodes connected to a first side of the mover, adjacent the first layer;
   a data storage medium capable of storing data, positioned on a second side of the mover; and
   read/write heads that store data to and retrieve data from the data storage medium, the heads being positioned on the second layer, adjacent the storage medium.

7. The system of claim 3, further comprising a capacitance detector that detects a capacitance at the mover electrode.

8. The system of claim 3, wherein the mover, mover layer, coupling block, and the flexure are contained within a plane, wherein the mover moves relative to the mover layer within the plane, and wherein the mover electrode and the counter electrode have an area of overlap, which area changes as the mover moves thereby changing the capacitance.

9. The system of claim 1, wherein the counter electrode is fixedly connected to the mover layer, adjacent the mover electrode.

10. The system of claim 1, wherein the mover comprises a data storage medium capable of storing data, and further comprising a read/write head that stores data to and retrieves data from the data storage medium.

11. A flexure for use in a microelectromechanical system (MEMS) device for connecting a mover in the MEMS device to a mover layer and controlling movement of the mover relative to the mover layer, the flexure comprising:
   a coupling block that moves according to movement of the mover relative to the mover layer and compensates for movement of the mover to reduce non-linearity of motion of the mover, the coupling block comprising a mover electrode capable of creating a capacitance with a counter electrode positioned adjacent to the mover electrode, the counter electrode being fixedly positioned relative to the mover layer, whereby the capacitance is related to a position of the mover;
   a first flexural connector that connects the coupling block to the mover; and
   a second flexural connector that connects the coupling block to the mover layer.

12. The flexure of claim 11, wherein the counter electrode is connected to a separate layer adjacent to the mover layer, and wherein the movement of the mover causes a change in an area of overlap between the mover electrode and the counter electrode.

13. The flexure of claim 12, wherein the first connector is directly connected between the coupling block and the mover, and wherein the second connector is directly connected between the coupling block and the mover layer, wherein the coupling block is a substantially flat member having the mover electrode disposed on a side of the of the coupling block, wherein the coupling block and the mover define a plane, and wherein the first and second flexural connectors allow the coupling block and mover to move within the plane.

14. A three-wafer microelectromechanical system (MEMS) device comprising:
   a first wafer comprising a counter electrode;
   a second wafer disposed parallel to the first wafer, the second wafer comprising:
     a mover layer that is fixedly attached to the first wafer;
     a mover capable of moving relative to the mover layer and the first wafer; and
     a flexure that connects the mover to the mover layer, the flexure comprising a mover electrode; and
   a third wafer disposed parallel to the first and second wafers such that the second layer is positioned between the first and third layers; and
   a capacitance detector that detects a capacitance between the mover electrode and the counter electrode,
   wherein the mover electrode moves relative to the counter electrode when the mover moves.

15. The MEMS device of claim 14, wherein the third wafer comprises a counter electrode adjacent the mover electrode.

16. The MEMS device of claim 14, wherein the flexure further comprises a coupling block that compensates for movement of the mover to reduce non-linearity of motion of the mover, which coupling block moves as the mover moves, and wherein the mover electrode is positioned on the coupling block.

17. The MEMS device of claim 16, wherein the coupling block moves in direct proportion to movement of the mover.

18. The MEMS device of claim 14 wherein the capacitance detector detects a plurality of capacitances from a plurality of mover electrodes and counter electrodes and determines a position of the mover based on the plurality of capacitances.

19. The MEMS device of claim 14, wherein the mover comprises a data storage medium capable of storing data, and further comprising a read/write head that stores data to and retrieves data from the data storage medium.

20. The MEMS device of claim 19,
wherein the mover has first and second sides, wherein the data storage medium is disposed on the first side of the mover adjacent the third wafer; and
wherein the read/write heads are positioned on the third wafer adjacent the data storage medium; and
further comprising an actuating motor that causes the mover to move, the motor comprising
a first set of electrodes connected to the first wafer; and
a second set of electrodes connected to the second side of the mover, adjacent first set of electrodes on the first wafer;
wherein the actuating motor causes the mover to move laterally relative to the first and third wafers, within a plane defined by the second wafer, and wherein an area of overlap between the mover electrode and counter electrode changes as the mover moves, thereby changing the capacitance detected.

* * * * *